United States Patent
Chen et al.

(10) Patent No.: US 11,641,657 B2
(45) Date of Patent: May 2, 2023

(54) RESOURCE UNIT (RU) ALLOCATION FOR EHT FOR POWER SPECTRAL DENSITY LIMITATIONS

(71) Applicant: Intel Corporation, Santa Clara, CA (US)

(72) Inventors: Xiaogang Chen, Portland, OR (US); Uri Perlmutter, Holon (IL); Ilan Sutskover, Hadera (IL); Assaf Gurevitz, Ramat Hasharon (IL); Qinghua Li, San Ramon, CA (US); Thomas J. Kenney, Portland, OR (US); Feng Jiang, Sunnyvale, CA (US); Laurent Cariou, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 143 days.

(21) Appl. No.: 17/010,340

(22) Filed: Sep. 2, 2020

(65) Prior Publication Data
US 2021/0068104 A1    Mar. 4, 2021

Related U.S. Application Data

(60) Provisional application No. 62/927,338, filed on Oct. 29, 2019, provisional application No. 62/895,742, filed on Sep. 4, 2019.

(51) Int. Cl.
| | |
|---|---|
| *H04W 72/04* | (2009.01) |
| *H04W 84/12* | (2009.01) |
| *H04W 72/044* | (2023.01) |
| *H04W 72/0446* | (2023.01) |

(52) U.S. Cl.
CPC ........... *H04W 72/0426* (2013.01); *H04W 72/0413* (2013.01); *H04W 72/0446* (2013.01); *H04W 72/0473* (2013.01); *H04W 84/12* (2013.01)

(58) Field of Classification Search
CPC ........ H04W 72/0426; H04W 72/0413; H04W 72/0446; H04W 72/0473; H04W 84/12
See application file for complete search history.

(56) References Cited

U.S. PATENT DOCUMENTS

| | | | | |
|---|---|---|---|---|
| 2015/0349995 | A1* | 12/2015 | Zhang | H04L 27/2613 375/295 |
| 2017/0126447 | A1* | 5/2017 | Yang | H04L 27/28 |
| 2017/0181136 | A1* | 6/2017 | Bharadwaj | H04W 72/042 |

* cited by examiner

*Primary Examiner* — Mohammad S Anwar
(74) *Attorney, Agent, or Firm* — Schwegman Lundberg & Woessner, P.A.

(57) ABSTRACT

Embodiments of an access point (AP) station (STA) configured for operating in a next-generation (NG) wireless local area network (WLAN) (i.e., EHT) are generally described herein. In some embodiments, a comb resource unit (RU) structure may be used to distribute tones of an RU across a wider bandwidth for narrow RU power spectral density (PSD) boosting for longer-range transmission in EHT to meet ETSI and/or FCC limitations.

20 Claims, 3 Drawing Sheets

FIG. 2

RESOURCE UNIT (RU) ALLOCATION FOR EHT FOR POWER SPECTRAL DENSITY LIMITATIONS

PRIORITY CLAIM

This application claims priority under 35 USC 119(e) to U.S. Provisional Patent Application Ser. No. 62/895,742, filed Sep. 4, 2019, and U.S. Provisional Patent Application Ser. No. 62/927,338, filed Oct. 29, 2019, which are incorporated herein by reference in their entireties.

TECHNICAL FIELD

Embodiments pertain next-generation (NG) wireless local area networks (WLANs) (i.e., Extremely High Throughput (EHT). Some embodiments relate to resource unit allocation to address power spectral density (PSD) limitation.

BACKGROUND

One issue with RF communication is power spectral density (PSD). Various standards bodies and regulatory agencies, such as ETSI and the FCC, have limitations on PSD, which may be based on the country or geographic location. These limitations on PSD affect the transmit power of a wireless device and become more of an issue when higher transmit power is needed for communicating over increased distances or in more noisy channels. Thus, there are general needs for techniques that address these situations while meeting the PSD limitations.

BRIEF DESCRIPTION OF THE DRAWINGS

Figure 2:
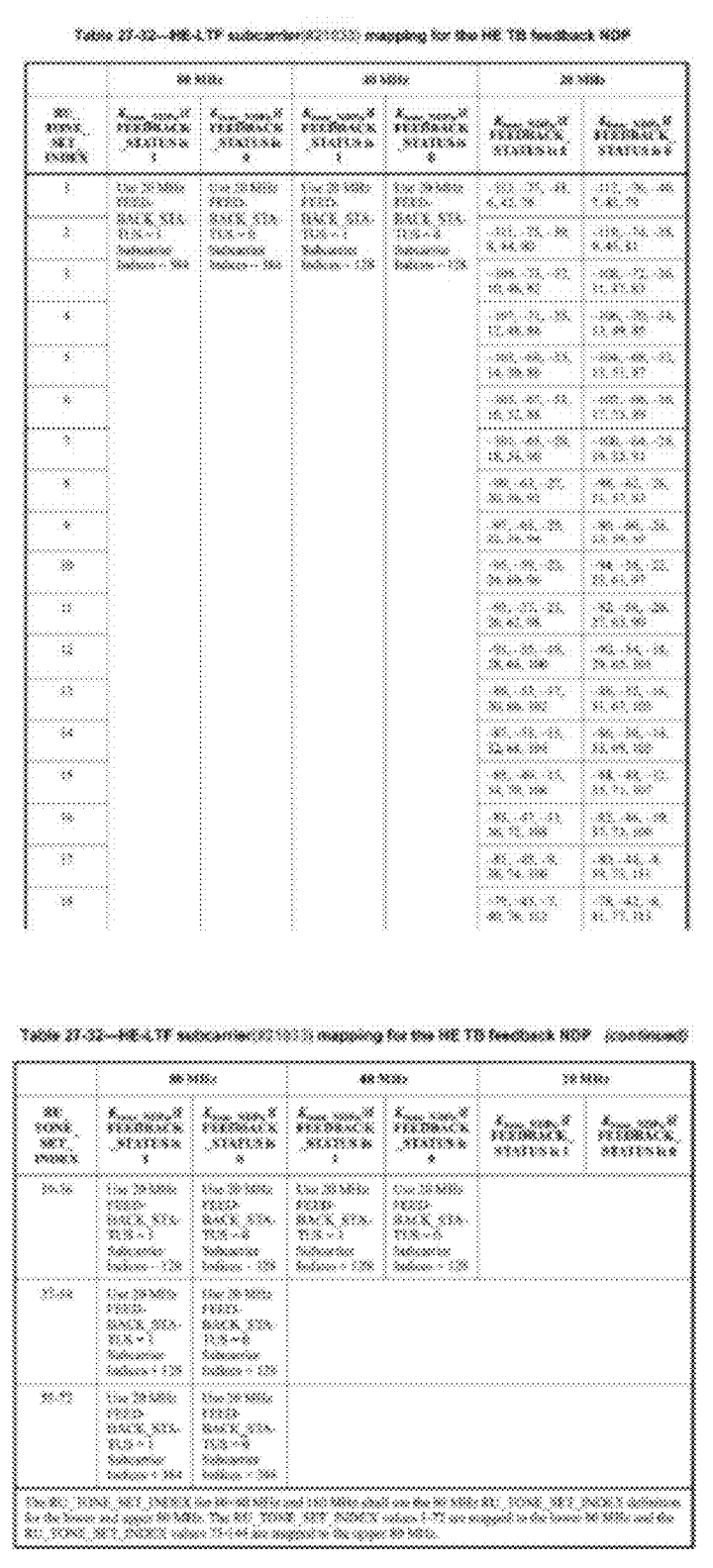

FIG. 2 is a table illustrating IEEE 802.11ax tone mapping suitable for use with some embodiments;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The IEEE 802.11ax ("11ax") draft standard defined narrow resource unit (RU), e.g., 26 tone or 52 tone, which can be used for power spectral density (PSD) boosting to close the link for long range transmission. However, the PSD boosting is not achievable due to European Telecommunications Standards Institute (ETSI) limitation.

This disclosure proposes a new RU to tone mapping scheme as a work around of the regulatory limitation. Example embodiments of the present disclosure relate to systems, methods, and devices for comb resource unit (RU) in 802.11be. In one embodiment, a comb RU system may facilitate a mechanism for defining a comb RU structure to distribute the tones across wider bandwidth for narrow RU. There is a high likelihood of adoption of this mechanism by the next gen Wi-Fi standard (EHT).

Figure 1:
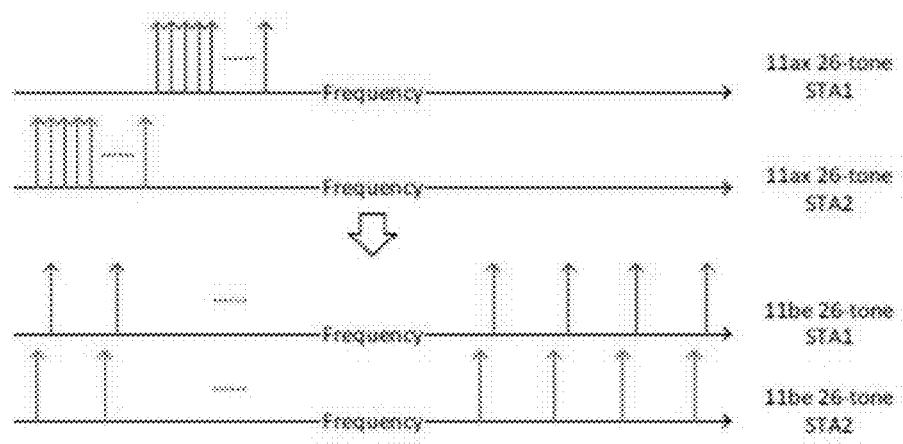
FIG. 1 illustrates a comb RU in accordance with some embodiments.

FIG. 1 illustrates a comb RU in accordance with some embodiments. In accordance with embodiments, a comb RU structure shown in FIG. 1 may be used to distribute tones of an RU across a wider bandwidth for narrow RU power spectral density (PSD) boosting for longer-range transmission in EHT to meet ETSI and/or FCC limitations.

Some embodiments are directed to an access point (AP) station (STA) configured for operating in a next-generation (NG) wireless local area network (WLAN) (i.e., EHT). In these embodiments, the AP STA may include transmitter circuitry, including processing circuitry and memory. In accordance with some embodiments, for standard range communication with a non-AP STA, the processing circuitry is configured to map tones to a standard (.11ax;) resource unit (RU) and allocate the standard RU to the STA. In accordance with these embodiments, for increased range communication with the non-AP STA, the processing circuitry is configured to map tones to a comb RU and allocate the comb RU to the non-AP STA. In these embodiments, the standard RU comprises a tone set having a predetermined number of adjacent tones within a narrow portion of a channel bandwidth (e.g., 26 adjacent tones over a 2 MHz portion of a 20 MHz channel). In these embodiments, the comb RU comprises a tone set having a predetermined number of non-adjacent tones distributed over/across the channel bandwidth. In some embodiments the AP STA may encode a frame comprising an EHT long training field (LTF) (EHT-LTF) for transmission to the non-AP STA. In some embodiments, tones of the EHT-LTF may be transmitted in accordance with the mapping of one of the standard RU and the comb RU.

In some embodiments, the frame may be a trigger frame (TF) for transmission to the non-AP STA. When the comb RU is allocated to the non-AP STA for an uplink transmission, an indication of the comb RU may be included in a user field of the trigger frame. In these embodiments, the AP STA may be configured to decode a response to the trigger frame from the non-AP STA. The response to the trigger frame may be the uplink transmission and may comprise an EHT long training field (LTF) (EHT-LTF). In these embodiments, tones of the EHT-LTF may be in accordance with the mapping of the comb RU when the comb RU was allocated to the non-AP STA.

In some embodiments, for a downlink transmission, the non-AP station may be configured to encode a user field of an EHT signal field (EHT-SIG) to indicate the allocation of the comb RU.

In some embodiments, for increased range communication using the comb RU, the processing circuitry of the AP STA may be configured to cause the transmitter circuitry to provide an increased transmit power (i.e., a PSD signal boost) for transmission of the EHT-LTF. In some embodiments, for the standard range communication using the standard RU, the processing circuitry is configured refrain from causing the transmitter circuitry to provide an increased transmit power (i.e., a PSD signal boost) for transmission of the EHT-LTF. In these embodiments, the intent is not to increase the power spectral density, but to maintain the PSD below a regulatory body limitation by spreading out the power among more subcarriers over a wider bandwidth.

In some embodiments, for a standard 26 tone RU comprising 26 adjacent tones transmitted over a 2 MHz portion of a 20 MHz channel, the comb RU comprises 26 non-adjacent tones, including two pilot tones, spread over the 20 MHz channel. These embodiments are described in more detail below.

In some embodiments, the processing circuitry is configurable to allocate a plurality of different comb RUs within a 20 MHz channel to two or more STAs. In these embodiments, the tones of the different comb RUs may be interleaved. These embodiments are described in more detail below.

In some embodiments, each comb RU may comprise two RU data tone sets of 12 tones each for a total of 24 data tones based on a RU tone index (shown in table 27-32 below), and two pilot tones. In some embodiments, the two pilot tones for each comb RU comprise a pilot tone group, the pilot tone group selected from the 18 unused tones of the 20 MHz channel to allocate two unique pilot tones per comb RU. In these embodiments, the 18 unused tones for a 20 MHz transmission, per table 27-32, can be repurposed as pilot tones for comb RUs. These embodiments are described in more detail below.

In some embodiments, the EHT-LTF is part of a trigger-based (TB) feedback null-data packet (NDP). In some embodiments, the comb RU is allocated for an uplink transmission comprising a SU PPDU or an ER SU PPDU. In some embodiments, a standard RU may be allocated for a SU PPDU, while the comb RU may be allocated for an ER SU PPDU (i.e., having a 2× longer HE-SIG-A) although the scope of the embodiments is not limited in this respect.

In some embodiments, for a standard 242 tone RU comprising 242 adjacent tones transmitted over a 20 MHz portion of an 80 MHz channel, the comb RU comprises 242 non-adjacent tones spread over the 80 MHz channel, the 242 non-adjcet tones of each comb RU including six pilot tone groups. In these embodiments, each group may have two pilot tones. In some embodiments, some of the data tones are repurposed as pilot tones. These embodiments are described in more detail below.

The ETSI limitation is summarized in table 1 below.

| Country/Geo | Power Spectral Density EIRP | | | | | | |
|---|---|---|---|---|---|---|---|
| | 2.4 GHz | 5.15-5.25 GHz | 5.25-5.35 GHz | 5.47-5.65 GHz | 5.65-5.725 GHz | 5.725-5.85 GHz | Unit |
| EU (Slave DFS with TPC) | 10 | 10 | 10 | 10 | 10 | N/A | dBm/MHz |
| EU (Master DFS with TPC) | 10 | 10 | 10 | 17 | 17 | N/A | dBm/MHz |
| EU (Slave DFS without TPC) | 10 | 10 | 7 | 10 | 10 | N/A | dBm/MHz |
| EU (Master DFS without TPC) | 10 | 10 | 7 | 14 | 14 | N/A | dBm/MHz |

From this table the below limitation may exist for narrow RU:

26-tone RU doesn't really get the expected ~9 dB PSD boost:
  Tx power capped at 10/13 dBm EIRP due to ETSI limit;
  Assuming a STA is capable of 20 dBm Tx power, that's 10/7 dB gap.

52-tone RU doesn't really get the expected ~6 dB PSD boost:
  Tx power capped at 13/16 dBm EIRP due to ETSI limit;
  7/4 dB gap to maximum Tx power (assuming 20 dBm Tx EIRP.)

106-tone RU barely transmitted with full power (20 dBm):
  20 dBm-9.2 dB(8.28 MHz)=10.8 dBm/MHz.

In one or more embodiments, a comb RU system may define comb RU to remove the power boosting cap for narrow RU.

As shown in FIG. 1, a comb RU system may define a new mapping rule that change the 11ax tone mapping (upper part) to the comb mapping (bottom part). The 26 tone RU is chosen as an example to explain the proposal. Instead of group the 26 tones locally with in 2 MHz, the proposed scheme distributes the 26 tones much wider than 2 MHz. e.g. the 26 tones can be distributed across 20 MHz, The tones for different 26 tone RU can be interleaved with each other as shown in FIG. 1. The different 26 tone RUs can be assigned to different clients. The comb RU can be used for SU PPDU or ER SU PPDU. The comb RU can also be used in OFDMA. For example, in the case of 80 MHz OFDMA, a comb RU system may define one 242 tone RU which only has comb RU; and the other three 242 tone RUs can reuse 11ax tone plan.

In one or more embodiments, a comb RU system may facilitate a comb RU to tone mapping:

11ax define a table for HE-LTF tone mapping used by TB NDP short feedback as below (table 27-32 copied from 11ax D4.3). Each RU tone set has 12 tones. The comb RU proposed above has 26 tones. That means two RU tone sets defined in the table 27-32 (see FIG. 2) may be reused to give 24 tones, and then add two pilot tones to get the 26 tone comb RU. Since the tones in each RU tone set in table 27-32 have already distributed across 20 MHz, the comb RU constructed from any two RU tone sets will also have distributed tone mapping.

For instance, the 24 data tones may be defined in the kth comb RU as:

$$k\text{th comb RU}=[RU\_Tone\_Set\_Index\_k, RU\_Tone\_Set\_Index\_k+9], \quad \text{Equ. (1)}$$

where $k=1, 2, \ldots, 9$.

where RU_Tone_Set_Index_k stands for the kth RU tone set in table 27-32, shown in FIG. 2.

Then 2 pilot tones for each comb RU may need to be determined. It is easier to define the pilot if the comb RU is used for SU or extended range (ER) single user (SU) physical layer (PHY) protocol data unit (PPDU), which is transmitted in 20 MHz. Because tone [−122:−114] and [114:122] are not used in table 27-32 for 20 MHz RU tone set definition, these 18 tones can be divided into 9 pilot groups each of which has 2 tones. Each pilot group can be assigned to a comb RU defined in equation 1. Such that 24 data tones plus the 2 pilot tones will be a comb RU.

If the comb RU is defined for OFDMA in 80 MHz/160 MHz/320 MHz tone plan, the abovementioned 18 tones cannot be repurposed. Because a 242 tone RU within 80 Mhz tone plan is not aligned with a standalone 20 MHz tone plan. In this case, the pilot tones can come from two sources:

1) Break down the data tone in a RU_TONE_SET_INDEX and repurpose as pilot tones. Each RU_TONE_SET_INDEX can be break down to 6 pilot groups and each of which has 2 pilots.

2) The residual tones in a 242 tone RU excluding all the data tones of comb RU. For example, The remaining tones in the lowest 242 tone RU of 80 Mhz channel means:

−500:−259 exclude $RU\_TONE\_SET\_INDEX_k$, k=1, 2, . . . , 18 for 80 MHz=[−500, −499, −498, −270:−259, −389:−379]. 26 tones in total. Any 18 tones may be chosen from the 26 tones as the 9 groups of pilots.

Figure 3:
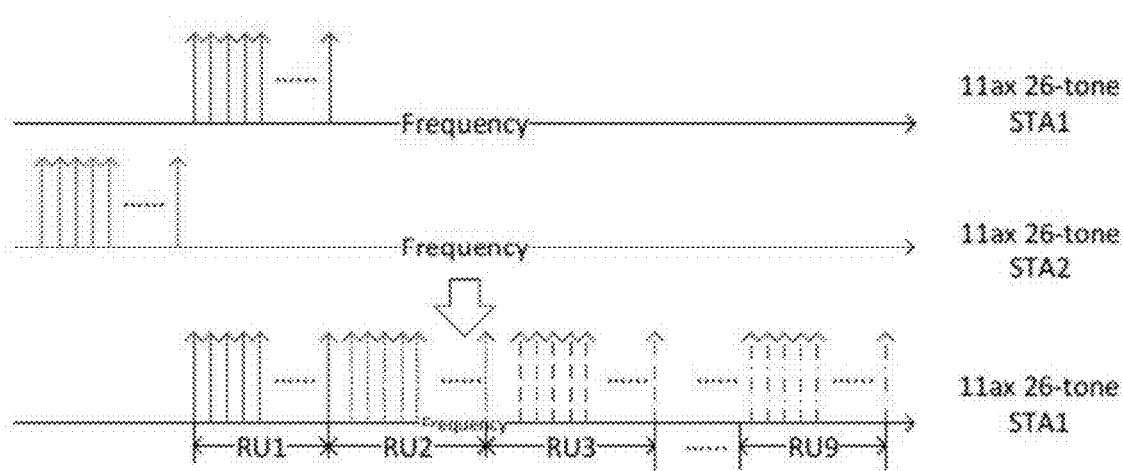
FIG. 3 illustrates RU duplication for longer range transmissions in accordance with some embodiments.

The remaining tones in the highest 242 tone RU of 80 MHz channel means:

259:500 exclude $RU\_TONE\_SET\_INDEX_k$, k=55, 56, . . . , 72 for 80 MHz;

The remaining tones in the second highest 242 tone RU of 80 MHz channel means:

17:258 exclude $RU\_TONE\_SET\_INDEX_k$, k=37, 38, . . . , 54 for 80 MHz;

The remaining tones in the second lowest 242 tone RU of 80 MHz channel means:

−258:−17 exclude $RU\_TONE\_SET\_INDEX_k$, k=19, 20, . . . , 36 for 80 MHz;

FIG. 3 illustrates RU duplication for longer range transmissions in accordance with some embodiments. In these embodiments, a tone plan for narrow RU, e.g. 26 tone or 52 tone is proposed such that it can be used for power spectral density (PSD) boosting to close the link for long range transmission. However, an alternative is needed to achieve long range transmission without PSD boosting. Example embodiments of the present disclosure relate to systems, methods, and devices for tone plan for long range transmission in 11be. In one embodiment, a tone plan for long range transmission system may facilitate an RU repetition tone plan for long range transmission without boosting the PSD for each tone, but instead (equivalent to PSD boosting) duplicate the transmission across multiple RUs in the whole 20 MHz or 242 tone RU.

As shown in FIG. 3, the transmitter may reuse the current 26 tone plan defined in 11ax, but duplicate the content of one 26 tone RU to nine 26 tone RU. Namely the 9×26 tone RU are duplication of each other. It is equivalent to boost the PSD per tone by 9 times with diversity gain.

The duplication can be used together with phase rotation to reduce the peak to average power ratio (PAPR). For example, a sequence with 9 elements [r1, r2, r9] may be created, each element is multiplied with the modulated constellations in one RU to reduce the PAPR. As an example the sequence can be $$r_n = e^{\left(\frac{j2\pi n}{9}\right)},$$

n=1, 2, . . . , 9.

Note that the number of duplication can be configurable. i.e. one RU is not necessarily be duplicated by 9 times. It could be 4 or 6 depends on the PSD boosting from transmitter.

The advantage of this proposal is that the 26 tone RU that is already defined may be reused. The downside is fewer clients can be scheduled in one PPDU. Because one client needs to occupied 9 RU instead of one RU. But remember the 11be has much wider bandwidth to accommodate more user. In addition, the number of repetition is configurable, namely more user can be scheduled by reducing the number of repetitions.

In some embodiments, a physical layer protocol data unit may be a physical layer conformance procedure (PLCP) protocol data unit (PPDU). In some embodiments, the AP and STAs may communicate in accordance with one of the IEEE 802.11 standards, such as the IEEE P802.11ax draft standard. IEEE draft specification IEEE P802.11ax/D4.3, August 2019 is incorporated herein by reference in its entirety.

Figure 4:
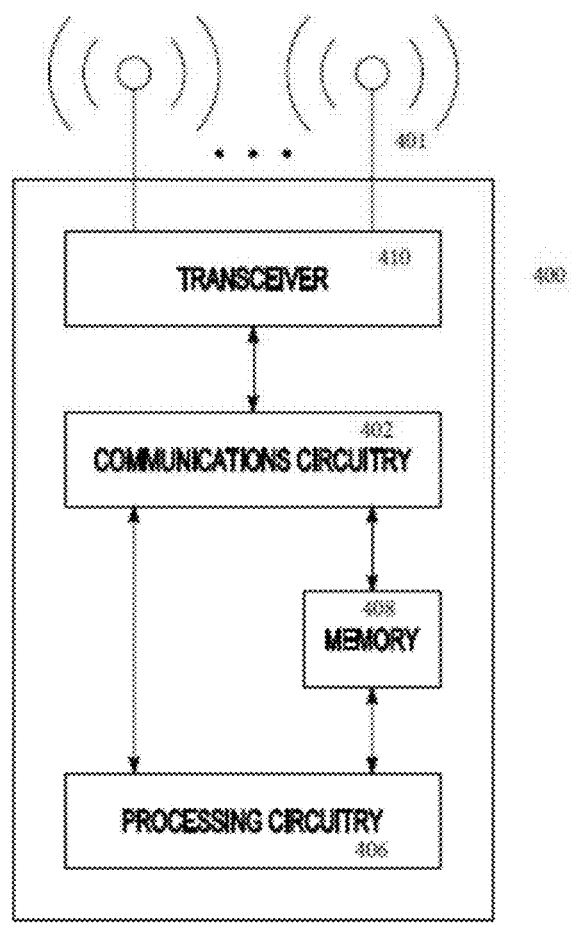
FIG. 4 is a functional block diagram of a station (STA) in accordance with some embodiments.

FIG. 4 is a functional block diagram of a station (STA) in accordance with some embodiments. In one embodiment, FIG. 4 illustrates a functional block diagram of a communication station that may be suitable for use as an AP STA or non-AP STA in accordance with some embodiments. The communication station 400 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 400 may include communications circuitry 402 and a transceiver 410 for transmitting and receiving signals to and from other communication stations using one or more antennas 401. The communications circuitry 402 may include circuitry that can operate the physical layer (PHY) communications and/or medium access control (MAC) communications for controlling access to the wireless medium, and/or any other communications layers for transmitting and receiving signals. The communication station 400 may also include processing circuitry 406 and memory 408 arranged to perform the operations described herein. In some embodiments, the communications circuitry 402 and the processing circuitry 406 may be configured to perform operations detailed in the above figures, diagrams, and flows.

In accordance with some embodiments, the communications circuitry 402 may be arranged to contend for a wireless medium and configure frames or packets for communicating over the wireless medium. The communications circuitry 402 may be arranged to transmit and receive signals. The communications circuitry 402 may also include circuitry for modulation/demodulation, upconversion/downconversion, filtering, amplification, etc. In some embodiments, the processing circuitry 406 of the communication station 400 may include one or more processors. In other embodiments, two or more antennas 401 may be coupled to the communications circuitry 402 arranged for sending and receiving signals. The memory 408 may store information for configuring the processing circuitry 406 to perform operations for configuring and transmitting message frames and performing the various operations described herein. The memory 408 may include any type of memory, including non-transitory memory, for storing information in a form readable by a machine (e.g., a computer). For example, the memory 408 may include a computer-readable storage device, read-only memory (ROM), random-access memory (RAM), magnetic disk storage media, optical storage media, flash-memory devices and other storage devices and media.

In some embodiments, the communication station 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 400 may include one or more antennas 401. The antennas 401 may include one or more directional or omnidirectional antennas, including, for example, dipole antennas, monopole antennas, patch antennas, loop antennas, microstrip antennas, or other types of antennas suitable for transmission of RF signals. in some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 400 may include one or more of a keyboard, a display, a non-volatile memory port, multiple antennas, a graphics processor, an application processor, speakers, and other mobile device elements. The display may be an LCD screen including a touch screen.

Although the communication station 400 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 400 may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for an access point (AP) station (STA) configured for operating in a next-generation (NG) wireless local area network (WLAN), the apparatus comprising:
   transmitter circuitry, including processing circuitry; and memory,
   wherein for standard range communication with a non-AP STA, the processing circuitry is configured to: map tones to a standard resource unit (RU); and allocate the standard RU to the non-AP STA, and
   wherein for increased range communication with the non-AP STA, the processing circuitry is configured to: map tones to a comb RU; and allocate the comb RU to the non-AP STA,
   wherein the standard RU comprises a tone set having a predetermined number of adjacent tones within a portion of a channel bandwidth, and
   wherein the comb RU comprises a tone set having a predetermined number of non-adjacent tones distributed across the channel bandwidth,
   encode a frame comprising an Extremely High Throughput (EHT) long training field (LTF) (EHT-LTF) for transmission to the non-AP STA, wherein tones of the EHT-LTF are transmitted in accordance with the mapping of one of the standard RU and the comb RU.

2. The apparatus of claim 1, wherein the frame is a trigger frame (TF) for transmission to the non-AP STA, wherein when the comb RU is allocated to the non-AP STA for an uplink transmission, an indication of the comb RU is included in a user field of the trigger frame; and wherein the processing circuitry is further configured to decode a response to the trigger frame from the non-AP STA, the response to the trigger frame being the uplink transmission and comprising the EHT-LTF, wherein tones of the EHT-LTF of the response are in accordance with the mapping of the comb RU when the comb RU was allocated to the non-AP STA.

3. The apparatus of claim 2, wherein for a downlink transmission, the non-AP station is configured to encode a user field of an EHT signal field (EHT-SIG) to indicate the allocation of the comb RU.

4. The apparatus of claim 3, wherein for the increased range communication using the comb RU, the processing circuitry is configured to cause the transmitter circuitry to provide an increased transmit power for transmission of the EHT-LTF of the trigger frame, and
   wherein for the standard range communication using the standard RU, the processing circuitry is configured refrain from causing the transmitter circuitry to provide an increased transmit power for transmission of the EHT-LTF of the trigger frame.

5. The apparatus of claim 4, wherein for a standard 26 tone RU comprising 26 adjacent tones transmitted over a 2 MHz portion of a 20 MHz channel, the comb RU comprises 26 non-adjacent tones, including two pilot tones, spread over the 20 MHz channel.

6. The apparatus of claim 5, wherein the processing circuitry is configurable to allocate a plurality of different comb RUs within a 20 MHz channel to two or more STAs, the tones of the different comb RUs being interleaved.

7. The apparatus of claim 6, wherein each comb RU comprises two RU data tone sets of 12 tones each based on a RU tone index, and two pilot tones, and
   wherein the two pilot tones for each comb RU comprise a pilot tone group, the pilot tone group selected from unused tones to allocate two unique pilot tones per comb RU.

8. The apparatus of claim 7, wherein the trigger frame is part of a trigger-based (TB) feedback null-data packet (NDP).

9. The apparatus of claim 5, wherein the comb RU is allocated for an uplink transmission comprising a single user (SU) physical layer protocol data unit (PPDU) (SU PPDU) or an extended range (ER) SU PPDU (ER SU PPDU).

10. The apparatus of claim 5, wherein for a standard 242 tone RU comprising 242 adjacent tones transmitted over a 20 MHz portion of a 80 MHz channel, the comb RU comprises 242 non-adjacent tones spread over the 80 MHz channel, the 242 non-adject tones of each comb RU including six pilot tone groups, each group having two pilot tones, wherein some of the data tones are repurposed as pilot tones.

11. A non-transitory computer-readable storage medium that stores instructions for execution by processing circuitry of an access point (AP) station (STA) configured for operating in a next-generation (NG) wireless local area network (WLAN), wherein the instructions configure the processing circuitry to:
   wherein for standard range communication with a non-AP STA, the processing circuitry is configured to: map tones to a standard resource unit (RU); and allocate the standard RU to the non-AP STA, and wherein for increased range communication with the non-AP STA, the processing circuitry is configured to: map tones to a comb RU; and allocate the comb RU to the non-AP STA, wherein the standard RU comprises a tone set having a predetermined number of adjacent tones within a portion of a channel bandwidth, and wherein the comb RU comprises a tone set having a predetermined number of non-adjacent tones distributed across the channel bandwidth, encode a frame comprising an Extremely High Throughput (EHT) long training field (LTF) (EHT-LTF) for transmission to the non-AP STA, wherein tones of the EHT-LTF are transmitted in accordance with the mapping of one of the standard RU and the comb RU.

12. The non-transitory computer-readable storage medium of claim 11, wherein the frame is a trigger frame (TF) for transmission to the non-AP STA, wherein when the comb RU is allocated to the non-AP STA for an uplink transmission, an indication of the comb RU is included in a user field of the trigger frame; and wherein the processing circuitry is further configured to decode a response to the trigger frame from the non-AP STA, the response to the trigger frame being the uplink transmission and comprising the EHT-LTF, wherein tones of the EHT-LTF of the response are in accordance with the mapping of the comb RU when the comb RU was allocated to the non-AP STA.

13. The non-transitory computer-readable storage medium of claim 12, wherein for a downlink transmission, the non-AP station is configured to encode a user field of an EHT signal field (EHT-SIG) to indicate the allocation of the comb RU.

14. The non-transitory computer-readable storage medium of claim 13, wherein for the increased range communication using the comb RU, the processing circuitry is configured to cause the transmitter circuitry to provide an increased transmit power for transmission of the EHT-LTF of the trigger frame, and wherein for the standard range communication using the standard RU, the processing circuitry is configured refrain from causing the transmitter circuitry to provide an increased transmit power for transmission of the EHT-LTF of the trigger frame.

15. The non-transitory computer-readable storage medium of claim 14, wherein for a standard 26 tone RU comprising 26 adjacent tones transmitted over a 2 MHz portion of a 20 MHz channel, the comb RU comprises 26 non-adjacent tones, including two pilot tones, spread over the 20 MHz channel.

16. The non-transitory computer-readable storage medium of claim 15, wherein the processing circuitry is configurable to allocate a plurality of different comb RUs within a 20 MHz channel to two or more STAs, the tones of the different comb RUs being interleaved.

17. The non-transitory computer-readable storage medium of claim 16, wherein each comb RU comprises two RU data tone sets of 12 tones each based on a RU tone index, and two pilot tones, and wherein the two pilot tones for each comb RU comprise a pilot tone group, the pilot tone group selected from unused tones to allocate two unique pilot tones per comb RU.

18. An apparatus for an access point (AP) station (STA) configured for operating in a next-generation (NG) wireless local area network (WLAN), the apparatus comprising:

transmitter circuitry, including processing circuitry; and memory, wherein for standard range communication with a non-AP STA, the processing circuitry is configured to: map tones to a standard resource unit (RU) within a channel; and allocate the standard RU to the non-AP STA, and wherein for increased range communication with the non-AP STA, the processing circuitry is configured to allocate one or more additional standard RUs (duplicated RUs) within the channel to the STA, wherein the processing circuitry is configured to encode a frame for transmission to the non-AP STA comprising: the standard RU; and the one or more additional standard RUs when allocated to the non-AP station for increased range communication.

19. The apparatus of claim 18, wherein transmitter circuitry is configured to phase shift the one or more additional RUs for a peak-to-average power ratio (PAPR) reduction, wherein different tone sets within the channel are allocated one or more additional standard RUs.

20. The apparatus of claim 19, wherein the processing circuitry is further configured to decode a response to a trigger frame from the non-AP STA, the response to the trigger frame being the uplink transmission and comprising the standard RU, and comprising the one or more additional standard RUs when allocated to the non-AP station for increased range communication.

* * * * *

UNITED STATES PATENT AND TRADEMARK OFFICE
CERTIFICATE OF CORRECTION

PATENT NO. : 11,641,657 B2
APPLICATION NO. : 17/010340
DATED : May 2, 2023
INVENTOR(S) : Chen et al.

It is certified that error appears in the above-identified patent and that said Letters Patent is hereby corrected as shown below:

In the Claims

In Column 8, Line 5, in Claim 2, after "and", insert a linebreak

In Column 8, Line 55, in Claim 10, delete "non-adject" and insert --non-adjacent-- therefor In Column 9, Line 21, in Claim 12, after "and", insert a linebreak In Column 10, Line 12, in Claim 17, after "and", insert a linebreak In Column 10, Lines 27-28, in Claim 18, after "RUs", delete "(duplicated RUs)"

In Column 10, Line 35, in Claim 19, after "additional", insert --standard--

Signed and Sealed this
Twentieth Day of August, 2024

Katherine Kelly Vidal
*Director of the United States Patent and Trademark Office*